Figure 1:
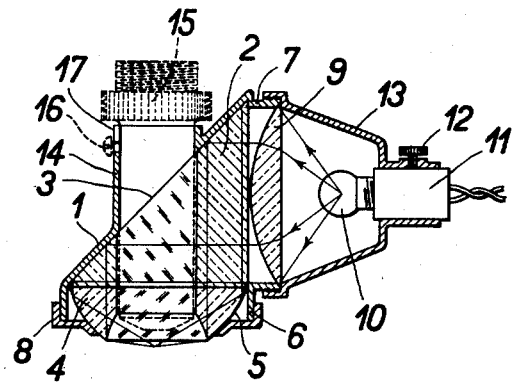

March 20, 1934.    R. STRAUBEL    1,951,636
ILLUMINATING DEVICE FOR MICROSCOPES
Filed Feb. 25, 1932

Inventor:
Rudolf Straubel

Patented Mar. 20, 1934

1,951,636

UNITED STATES PATENT OFFICE

1,951,636

ILLUMINATING DEVICE FOR MICROSCOPES

Rudolf Straubel, Jena, Germany, assignor to the firm Carl Zeiss, Jena, Germany

Application February 25, 1932, Serial No. 595,117
In Germany March 3, 1931

5 Claims. (Cl. 88—40)

The invention concerns a device for dark-field illumination of microscopic objects in incident light, in which use is made of a lateral light source. This device, which is to be attached to an objective fixed to the microscope tube, offers the advantage that it can be applied with different microscope objectives and given by a simple manipulation such a position relatively to the objective that a special adjustment of the pencil of illuminating rays relative to the object can be dispensed with and that the device is in exact position relative to the object as soon as the microscope objective is correctly adjusted. The illuminating rays gather in that plane which is sharply imaged by the objective, this fusion being independent of the altitudinal position of the microscope tube. According to the invention this aim is arrived at by combining a plane reflector, inclined relatively to the optical axis of the microscope objective and deviating the illuminating rays into the viewing direction, and a reflecting system making the rays incident in the viewing direction gather approximately at one point, the said plane reflector and the said reflecting system being a uniform constructional element which can be so fixed to the microscope objective that it grips round the same in a ring-like manner. In this case it may be of advantage to have the device so constructed that the light source is in rigid connection with the same.

When using an illumination system that supplies light to the device from one side only, the consequence of making the illumination device go round the microscope objective is that under certain azimuthal angles no rays strike the object, since part of the circumference is shielded by the microscope objective. This disadvantage is overcome by applying in the device a plane reflector consisting of at least two parts inclined relatively to each other. If a corresponding number of pencils of illumination rays are directed to a device of the said construction, another part of the entire angular azimuthal range being coordinated to each of these pencils, the result will be an illumination in which rays strike the object on all sides. On the other hand, there also is a possibility of having the object illuminated from one side only, which is achieved by reducing to one the number of ray pencils. It therefore is advisable to make the device rotatable about the optical axis of the microscope objective and this with a view to illuminate the object at will from any direction also when the microscope is not equipped with a revolving stage.

An especially compact construction is arrived at when the plane reflector (eventually consisting of a plurality of parts inclined relatively to each other) is a reflecting prism and when the converging reflecting system is a glass body cemented to the reflecting prism.

Figure 3:
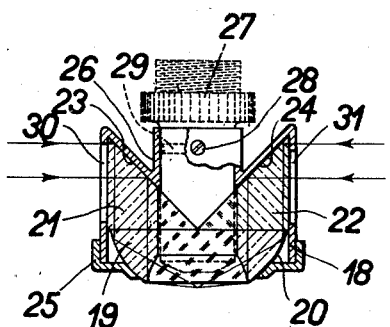
Figure 2:
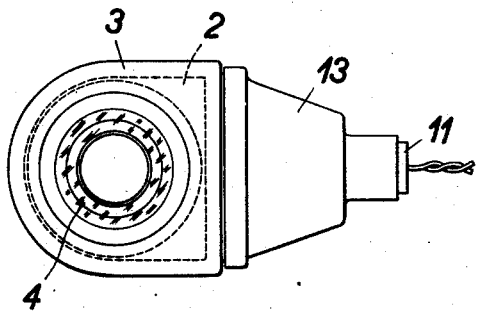
Figure 4:
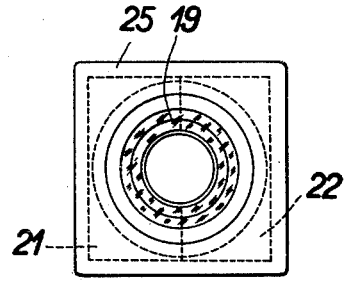
Figure 5:
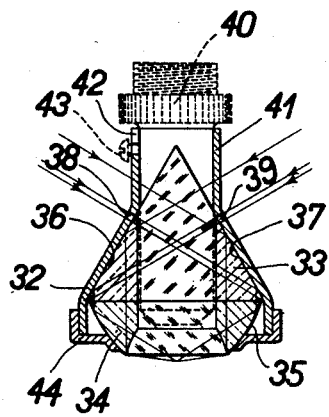
Figure 6:
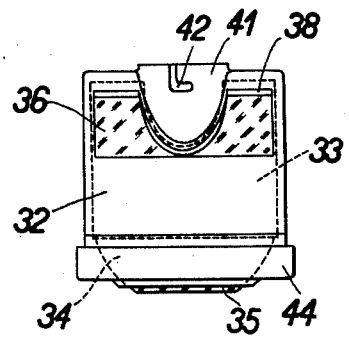

The accompanying drawing illustrates three constructional examples of the device according to the invention. Figure 1 shows the first example in a central section in elevation, and Figure 2 is a view from below. The second example is represented by Figure 3 in a central section in elevation and by Figure 4 in a view from below. The third example is illustrated by Figure 5 in a central section in elevation, and Figure 6 shows a lateral view thereof.

In the first example (Figures 1 and 2) a housing 1 encloses a rectangular isosceles reflecting prism 2 the hypotenuse surface 3 of which is silvered. An annular glass body 4, the exterior bounding surface 5 of which has the shape of a paraboloid of revolution, is cemented to the prism 2. The reflecting prism 2 has an aperture corresponding to the aperture in the glass body 4. Those parts of the prism 2 which are not required are removed by cuts along cylindrical surfaces at right angles to the side surfaces. On the sides corresponding to the two sides of the prism 2, the housing 1 is provided with cylindrical parts 6 and 7, respectively, part 6 being covered by a lid 8 and part 7 being the mount for a converging lens 9 having in its focus an incandescent lamp 10. The incandescent lamp 10 is screwed into a lamp holder 11 fixed by means of a screw 12 in a cap 13 vaulting over the lens 9. On that side of the housing 1 which corresponds to the hypotenuse surface of the prism 2 is cast a cylindrical part 14 which can be fixed in a bayonet like manner to a microscope objective 15 by means of a screw 16 and an angular slot 17 in such a way that the objective 15 extends into the aperture of the reflecting prism 2 and of the glass body 4.

When using the device, the holder 11 for the incandescent lamp 10 is to be connected to a source of current. The light rays emitted by the incandescent lamp 10 and striking the converging lens 9 are refracted by this lens 9 in such a manner that they enter the prism 2 as pencils of parallel rays and are deviated by the reflecting surface 3 into the viewing direction. They strike the reflecting surface 5 of the glass body 4, where they are deviated in such a manner that they gather in that plane which is sharply imaged by the objective 15. Every objective 15 that is to be used in conjunction with the device must have a screw 16 the position of which is determined by the coincidence of the fusion of the rays with the object plane to be imaged. Changing an objective 15 for another therefore requires nothing else but fixing the device to the other objective. The device may be fixed direct to the tube, which is effected by means of a suitable suspension appliance, in which case the objective 15 only requires being provided with a suitable rest of any construction that determines for the objective the correct position of the illumination device. The comparatively great weight of the device, which eventually may tell on the tube, may be compensated by a suitable counter-weight.

In the second constructional example (Figures 3 and 4), the plane reflector consists of two parts inclined relatively to each other at an angle of approximately 90°. In addition to an annular glass body 19 having a silvered exterior bounding surface 20 of the form of a paraboloid of revolution, the housing 18 contains two rectangular isosceles reflecting prisms 21, 22 the hypotenuse surfaces of which, 23 and 24, respectively, are silvered. One each of the side surfaces of the prisms 21, 22 is cemented to the glass body 19, and each of the said two prisms is provided with an aperture corresponding to that in the said glass body. The housing 18 is covered by means of a lid 25 and is provided with a cylindrical part 26 which, by means of a screw 28 and a groove 29 in a microscope objective 27, can be attached to this microscope objective 27 in such a manner that it can be rotated about the optical axis of this objective. The two non-cemented side surfaces of the prisms 21, 22 correspond to light entrance apertures 30, 31 in the housing 18.

When using the device, each of the prisms 21, 22 is to receive through the light entrance apertures 30, 31 a pencil of parallel rays. Each of these two pencils has to illuminate one half of the annular glass body 19. By stopping down one of the two pencils the device therefore can be used for one-side illumination of the object. When the azimuth of the illumination is to be altered, the device is turned about the microscope objective into the desired position. The pencils of illuminating rays may be produced in any desired manner. For instance, they may be provided in the manner described with respect to the first constructional example, in which case each of the light entrance apertures 30, 31 is to be provided with an illumination system of its own. However, when placing in front of each of the light entrance apertures 30, 31 a reflector, or a reflecting prism constructed in the known manner and cemented to the respective prism, inclined at approximately 45° to those side surfaces of the prisms 21, 22 which have to admit the light, it is possible to direct to the two prisms 21, 22 parts of a pencil of light rays produced by one illumination system.

In the third constructional example (Figures 5 and 6), a housing 32 contains a reflecting prism 33 of equilateral cross section and an annular glass body 34 cemented thereto, the silvered exterior bounding surface 35 of this body 34 having the form of a paraboloid of revolution. The prism 33 is provided with an aperture corresponding to that in the glass body 34; its free side surfaces 36, 37 serve as reflecting surfaces and, each surface relatively to the other, as light entrance surfaces. They correspond to light entrance surfaces 38, 39 in the housing 32 which, for the purpose of being fixed to a miscroscope objective 40, is provided with a cylindrical part 41 and an angular slot 42, the objective 40 having a corresponding screw 43. The housing 32 is covered by means of a lid 44.

When using the device, a pencil of parallel rays must be directed to each of the light entrance apertures 38, 39. The directions of the two light pencils are to be assumed to be in reverse senses and to be inclined at 30° to the horizontal plane. The light pencil may be produced in any way, for instance in the way described with reference to the first two constructional examples.

I claim:

1. A device for dark-field illumination of microscopic objects in incident light, comprising a mount detachably connected to an objective fixed to the microscope tube, a plane reflector provided in this mount and adapted to receive lateral illuminating rays and to deviate these rays into the direction of the axis, a reflecting system going round the axis of the objective and adapted to make rays reflected by the said plane reflector fuse approximately at one point, the plane reflector and the converging reflecting system being rigidly connected to each other.

2. A device for dark-field illumination of microscopic objects in incident light, comprising a mount detachably connected to an objective fixed to the microscope tube, a light source provided at one side of the mount, a plane reflector provided in this mount and adapted to receive rays coming from the light source and to deviate these rays into the direction of the axis, a reflecting system going round the axis of the objective and adapted to make rays reflected by the said plane reflector fuse approximately at one point, the plane reflector and the converging reflecting system being rigidly connected to each other.

3. In a device according to claim 1, the said plane reflector consisting of at least two parts inclined relatively to each other.

4. In a device according to claim 1, the mount permitting the device to be turned about the axis of the objective.

5. A device for dark-field illumination of microscopic objects in incident light, comprising a mount detachably connected to an objective fixed to the microscope tube, a reflecting prism provided in this mount and adapted to receive lateral illuminating rays and to deviate these rays into the direction of the axis, a reflecting glass body going round the axis of the objective, this glass body being cemented to the reflecting prism and adapted to fuse approximately at one point rays reflected by the reflecting prism.

RUDOLF STRAUBEL.